United States Patent [19]
Garcia et al.

[11] Patent Number: 5,504,586
[45] Date of Patent: Apr. 2, 1996

[54] METHOD AND DEVICE FOR PLACING OF DRIVE COUNTER-ROLLS UNDER PRESSURE IN A MACHINE SUCH AS A FACSIMILE MACHINE

[75] Inventors: Salvador Garcia, Argenteuil; Patrick Vegeqis, Fourqueux, both of France

[73] Assignee: Societe D'Application Generales D'Electricite, France

[21] Appl. No.: 189,895

[22] Filed: Feb. 1, 1994

[30] Foreign Application Priority Data

Feb. 2, 1993 [FR] France ................................. 93 01091

[51] Int. Cl.⁶ ............................. H04N 1/00; H04N 1/04
[52] U.S. Cl. ........................ 358/400; 358/496; 358/498
[58] Field of Search .............................. 358/400, 496, 358/498, 471, 474, 497, 488, 493, 494, 296, 300, 304, 401, 501; 226/187, 190, 194; 271/274, 273; 382/59; 292/152; 248/576, 581, 624

[56] References Cited

U.S. PATENT DOCUMENTS

| | | | |
|---|---|---|---|
| 3,741,536 | 6/1973 | Andersor | 271/274 |
| 3,949,869 | 4/1976 | Rand | 281/27.1 |
| 3,964,657 | 6/1976 | Lenk et al. | 226/187 |
| 3,966,188 | 6/1976 | Maguire | 271/274 |
| 4,190,185 | 2/1980 | Thate | 271/274 |
| 4,763,575 | 8/1988 | Miciukiewicz | 271/274 |
| 4,775,140 | 10/1988 | Foster | 271/274 |
| 4,780,767 | 10/1988 | Ohta et al. | 358/296 |
| 4,850,584 | 7/1989 | Watashi | 271/274 |
| 4,953,037 | 8/1990 | Ito et al. | 358/496 |
| 5,203,217 | 4/1993 | Buckley | 271/273 |
| 5,209,133 | 5/1993 | Ballard | 271/273 |
| 5,221,970 | 6/1993 | Sakamoto et al. | 358/400 |
| 5,327,250 | 7/1994 | Ikeda | 358/400 |

FOREIGN PATENT DOCUMENTS

| | | | |
|---|---|---|---|
| 079821 | 5/1983 | European Pat. Off. | H04N 1/02 |
| 924757 | 2/1990 | Germany | H04N 1/10 |

*Primary Examiner*—Edward L. Coles, Sr.
*Assistant Examiner*—Fan Lee
*Attorney, Agent, or Firm*—Rosenman & Colin

[57] ABSTRACT

A method and apparatus for fastening a holding member (6) for the springs (4) that apply pressure to the counter-rolls (3) for driving sheets of paper on the frame (2) of a machine, such as a facsimile machine, is disclosed. The method comprises the steps of:

1) pressing the holding members against the springs so as to compress the springs against the rollers;
2) positioning the holding members (8, 11, 12) relative to locator tabs and ribs of the frame;
3) causing and maintaining the aforementioned positive placement by the force of compression of the aforementioned elastic springs.

8 Claims, 1 Drawing Sheet

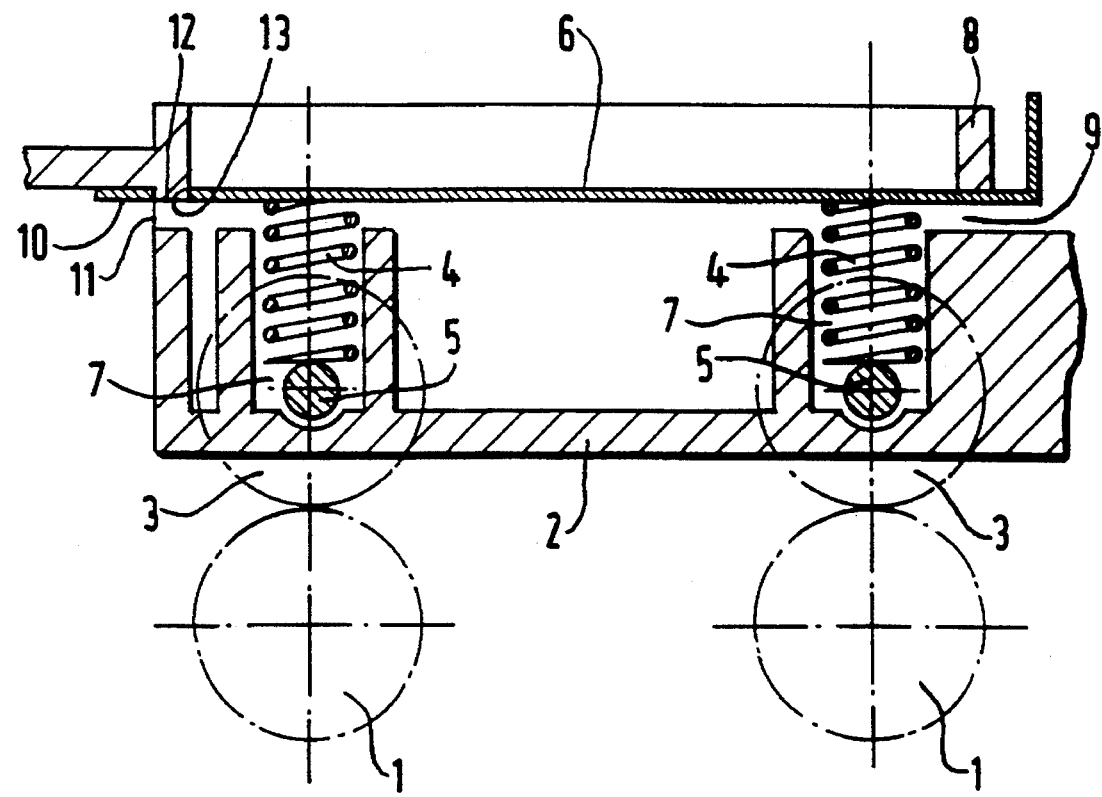

METHOD AND DEVICE FOR PLACING OF DRIVE COUNTER-ROLLS UNDER PRESSURE IN A MACHINE SUCH AS A FACSIMILE MACHINE

BACKGROUND OF THE INVENTION

1. Field of the Invention

The present invention relates to a method for fastening elastic members on the frame of a machine such as a facsimile machine for pressing a pressure roller against sheets of paper, as well as a device for pressing pressure rollers against the sheets of paper to drive the paper in a machine such as a facsimile machine. More particularly, it relates to a device having a respective elastic member compressed between said pressure rollers and a holding member fastened to the frame of the machine.

2. Discussion of Related Art

In machines intended for business offices, for instance facsimile machines, where it is necessary to drive sheets of paper, the principle most commonly employed in order to perform this function is the use of elastomer rollers. In order to press the paper against these rollers, pressure rollers are used which exert a radial pressure on the elastomer rollers due to elastic means such as leaf of coil springs, which act on the shafts of the pressure rollers.

These elastic means furthermore generally press against an intermediate holding member which is fastened to the frame of the machine by conventional means of attachment (screws, rivets, clipping, etc.).

Such fastening means, however, are inconvenient in that they require a large number of parts and thus increase the time required for assembly and servicing.

The present invention is directed at overcoming these drawbacks.

For this purpose, the invention provides, first of all, a method of fastening on the frame of a machine, such as a facsimile machine, members for holding elastic means for placing the pressure rollers for driving the sheets of paper under pressure, comprising the steps of:

applying the holding members to the elastic means in such a manner as to compress the latter;

bringing said holding members into position relative to fastening means on the frame; and spring loading the holding members against the fastening means by the force of compression of the said elastic means.

The invention also provides a device for placing under pressure the pressure rollers for driving sheets of paper in a machine such as a facsimile machine, comprising elastic means compressed between said pressure rollers and a holding member fastened to the frame of the machine. Said holding member is mounted on means for locating the holding member on the frame and held in this position by the force of the elastic means.

It will therefore be understood that the holding member and the elastic means actually hold each other, without other means for fastening or holding these members being necessary.

The invention thus makes it possible to reduce the number of parts used, the cost of the function of fastening the holding members, the time required for assembling and the cost of servicing (disassembly and spare parts). Due to the reduction in the number of parts, it is also possible to increase the dependability of the machine.

In one specific embodiment, the holding member is a base plate.

This plate can, in particular, have at least one extension which is engaged in a hole in the frame which is substantially perpendicular to the direction of compression of said elastic means.

The frame can furthermore be provided with at least one check tab which is engaged in a hole in the plate substantially in the direction of compression of said elastic means.

One particular embodiment of the invention will now be described, by way of illustration and not of limitation, with reference to the accompanying sole FIGURE, which is a sectional vies through a device in accordance with the invention.

The FIGURE shows the drive rollers 1 of a facsimile machine. These rollers 1 are borne by bearings (not shown), mounted in the frame 2 of the machine.

In order to press a sheet of paper against the drive rollers 1, pressure rollers 3 whose axis is parallel to the axis of the drive rollers 1 exert a radial pressure on the latter. This pressure is exerted by means of coil springs 4 resting at one end of the axels 5 of the pressure rollers and, on the other end, against a holding plate 6 which is integral with the frame 2. The springs 4 are housed in blind holes 7 in the frame, the wall of which are pierced near the bottom to permit the passage of the axels 5 and the open end of which is on the side facing the plate 6.

The periphery of plate 6 is held by the springs 4 against a rib 8 of the frame. In this position, the plate 6 is substantially parallel to the axels of the rollers 1 and of the pressure rollers 3 and perpendicular to the axes of the holes 7 and of the springs 4.

For the putting in place of the plate 6, the frame 2 has a slot 9 in which the plate 6 is introduced and caused to slide. This sliding takes place, after the springs 4 have been compressed, on the outer ends of these springs 4.

On the end which is first introduced into the slot 9 the plate 6 has an extension lug 10 at the end of the positioning of the plate 6, which passes into a hole 11 in the frame. This hole 11 receives the plate as it is inserted through the slot 9, as noted above, and therefore is substantially perpendicular to the direction of compression of the springs 4.

The edge of the hole 11 opposite the spring 4 forms a check tab 12, which is therefore parallel to the direction of compression of the springs 4 and which penetrates into a hole 13 in the plate 6 when the latter is completely in place. In this position, the plate 6 is therefore positively located on the frame 2 and, more particularly, on its rib 8 and held in this secure position by the pressure exerted by the springs 4.

Due to the penetration of the extension lug 10 of the plate 6 into the hole 11 in the frame and the penetration of the check tab 12 into the hole 13 of the plate 6, no further movement of the plate 6 is possible without first compressing the springs 4. The plate 6 is thus held perfectly in normal use.

On the other hand, its removal for servicing of any kind is particularly easy since it is merely necessary to press against the plate in order to compress the springs 4 and then to pull on the plate so as to remove it through the slot 9 in the frame 2.

No additional means of attachment is necessary for fastening the plate 6 to the frame 2.

We claim:

1. A device for pressing pressure rollers against sheets of paper, for driving sheets of paper in a machine such as a facsimile machine, said device comprising:

an elastic member;

a holding member adapted to be attached to the frame of the machine, said elastic member being adapted to be compressed between the pressure roller and said holding member;

fastening means for holding said holding member in a predetermined position by the force of said elastic member.

2. The apparatus of claim 1 wherein said fastening means are ribs adapted to resist the pressure applied against said holding member by said elastic member.

3. The apparatus of claim 1 wherein said elastic means are springs partially inserted in blind holes in a frame supporting the rollers.

4. A device according to claim 1, in which the said holding member is a base plate.

5. A device according to claim 4, in which the said plate has at least one extension lug adapted to engage a tab on the frame which is substantially perpendicular to the direction of compression of the said elastic means.

6. A device according to claim 4, in which the frame is provided with at least one check tab which is adapted to engage a hole in the plate, substantially in the direction of compression of the said elastic means.

7. A method for fastening a holding member that secures an elastic member that presses a pressure roller against sheets of paper, said method comprising the steps of:

pressing the holding member against elastic means so as to compress the elastic means against the pressure roller;

bringing said holding member into position relative to fastening means on the frame;

spring-loading the holding member against said fastening means by the force of said elastic means.

8. A method for fastening a holding member that secures an elastic member that presses a pressure roller against a support frame, said method comprising the steps of:

pressing the holding member against elastic means so as to compress the elastic means against the pressure roller and press the pressure roller against the support frame;

bringing said holding member into position relative to fastening means on the frame;

inserting an extension lug on the holding member through an opening in the support frame in a direction perpendicular to the force exerted by said elastic means;

inserting a check tab through the holding member;

spring-loading the holding member against said fastening means by the force of said elastic means.

* * * * *